(12) United States Patent
Baker

(10) Patent No.: US 6,884,447 B2
(45) Date of Patent: Apr. 26, 2005

(54) CONFECTIONERY WITH BODY, HANDLE AND CONTAINER

(76) Inventor: Brad Baker, 888 Garden of the Gods Rd., Colorado Spring, CO (US) 80907

(*) Notice: Subject to any disclaimer, the term of this patent is extended or adjusted under 35 U.S.C. 154(b) by 283 days.

(21) Appl. No.: 09/874,446

(22) Filed: Jun. 4, 2001

(65) Prior Publication Data

US 2002/0015766 A1 Feb. 7, 2002

(51) Int. Cl.[7] .......................... B65D 85/60; A23G 3/00; A23G 3/24
(52) U.S. Cl. ....................... 426/104; 426/112; 426/115; 426/134; 426/110
(58) Field of Search ................................. 426/115, 110, 426/120, 134, 90, 91, 117, 112, 104; 215/6, 391; 206/219, 457; 446/386, 390, 73, 76, 391, 475, 72, 16; 222/78; D1/104

(56) References Cited

U.S. PATENT DOCUMENTS

| 1,098,653 A | 6/1914 | Whisenant |
| 1,239,378 A | 9/1917 | Foster |
| 1,390,667 A | 9/1921 | Bonestell |
| 1,404,883 A | 1/1922 | Murray |
| 1,513,231 A | 10/1924 | English |
| D69,277 S | * 1/1926 | Josphsohn |

(Continued)

FOREIGN PATENT DOCUMENTS

| ES | WO 00/04790 | 3/2000 | ............ A23G/3/00 |
| FR | 2589824 A | 5/1987 | |
| GB | 2093433 A | * 9/1982 | |
| GB | 2297306 A | 7/1996 | |
| WO | WO9918011 A2 | * 4/1999 | |
| WO | WO oo/19803 A2 | 4/2000 | |

OTHER PUBLICATIONS

Humphrey, MISCmedia for Oct. 27, 1999 Dandy Candy, www.MISCmedia.com.*
Merriam–Webster Dictionary Online, www. m–w.com.*
Professional Cancy Buyer–Jul./Aug. 2000–All Candy Expo Show Wrap–Up–continued, pp. 1–5, http://www.retailmerchandising.net/candy/archives/0800/0800sh_2.asp.*
Lucasworld Website, Acidito Lucas, http://ww.mexicool.com/weblucas/factory/punker.htm.*
Candy Warehouse Website, Sour Punker Pops: 24CT Display, pp. 1–2. http://www.candywarehouse.com/sourpunpop24.html.*
Crazy About Candy Website, http://www.crazyaboutcandy.com/candy/productpages/bottlepops. html (Mar. 27, 2003).
Topps Candy & Gum Website, pp. 1 and 2, http://www.topps.com/Confectionery/confHistory.html and http://www.toppscanada.com/Confectionery/ (Mar. 25, 2003).
Topps Candy & Gum Website, pp. 1 and 2, http://www.toppscanada.com/Confectionery/ (Mar. 25, 2003).
Product package: Pop Rocks Zeta Espacial SA for Chupa Chups, Georgia.
Product package: Ring Pop Lollipops, The Topps Company, Inc., Duryea PA.
Product package: "Crazy Dips" Chupa Chups USA, Atlanta GA.

Primary Examiner—Milton I. Cano
Assistant Examiner—Robert Madsen
(74) Attorney, Agent, or Firm—Deborah A. Peacock; Jeffrey D. Myers; Peacock, Myers & Adams P.A.

(57) ABSTRACT

A confectionery comprising a container, a handle portion above the container, a body attached to the handle portion and disposed within the container, and preferably a flowable confectionery disposed within the container.

24 Claims, 6 Drawing Sheets

U.S. PATENT DOCUMENTS

| | | | |
|---|---|---|---|
| 1,718,997 A | 7/1929 | Burt | |
| 1,963,050 A | 6/1934 | Graham | |
| 2,018,050 A | 10/1935 | Bentley | |
| D104,724 S * | 6/1937 | Lasher | |
| 2,102,329 A | 12/1937 | Nelson et al. | 229/62 |
| D119,275 S * | 3/1940 | Lowenstein | |
| 2,532,729 A | 12/1950 | Millstein | 46/11 |
| 2,636,649 A | 4/1953 | Corriveau | |
| 2,882,170 A | 4/1959 | Stewart | 99/180 |
| 2,895,834 A | 7/1959 | Brav | |
| 3,085,883 A * | 4/1963 | Collier | 426/104 |
| 3,317,839 A | 5/1967 | Landecker | 325/106 |
| 3,355,067 A | 11/1967 | Espinal | |
| 3,821,425 A * | 6/1974 | Russell | 426/110 |
| D242,645 S | 12/1976 | Shorin et al. | 45/10 |
| 4,001,457 A | 1/1977 | Hegadorn | 426/572 |
| 4,061,783 A | 12/1977 | Hoffman et al. | 426/87 |
| 4,120,987 A | 10/1978 | Moore | 426/572 |
| 4,241,092 A | 12/1980 | Halik et al. | 426/96 |
| 4,254,149 A | 3/1981 | Rudolph et al. | 426/5 |
| 4,262,029 A | 4/1981 | Kleiner et al. | 426/512 |
| 4,271,206 A | 6/1981 | Fariel et al. | 426/572 |
| 4,273,793 A | 6/1981 | Fariel et al. | 426/572 |
| 4,275,083 A | 6/1981 | Colten et al. | 426/96 |
| 4,282,263 A | 8/1981 | Barnes et al. | 426/572 |
| 4,287,216 A | 9/1981 | Mangano | 426/93 |
| 4,289,790 A | 9/1981 | Bruelle | 426/93 |
| 4,289,794 A | 9/1981 | Kleiner et al. | 426/660 |
| 4,313,843 A | 2/1982 | Bollyky et al. | 252/188.3 |
| 4,334,934 A | 6/1982 | Barnes et al. | 127/9 |
| 4,356,198 A | 10/1982 | Parada et al. | 426/96 |
| D274,859 S | 7/1984 | Harris et al. | 1/18 |
| 4,491,597 A | 1/1985 | Varvil et al. | 426/103 |
| 4,755,390 A | 7/1988 | Calandro et al. | 426/293 |
| 4,837,039 A | 6/1989 | Escola Gallart et al. | 426/572 |
| 4,902,519 A | 2/1990 | Ream et al. | |
| 4,914,748 A | 4/1990 | Schlotter, IV et al. | 362/109 |
| 4,935,189 A | 6/1990 | Mochizuki et al. | 426/474 |
| 5,023,098 A | 6/1991 | Sumi et al. | 426/474 |
| 5,027,986 A | 7/1991 | Heinzel et al. | |
| 5,112,628 A | 5/1992 | Conrad | |
| 5,122,306 A | 6/1992 | Van Moer et al. | 252/587 |
| 5,158,349 A | 10/1992 | Holland et al. | 362/34 |
| 5,165,951 A | 11/1992 | Gallart et al. | 426/572 |
| 5,232,635 A | 8/1993 | Van Moer et al. | 252/700 |
| 5,279,842 A | 1/1994 | Escola Gallart et al. | 426/282 |
| 5,354,191 A * | 10/1994 | Bobis | 425/118 |
| 5,370,884 A | 12/1994 | Coleman | |
| 5,503,274 A | 4/1996 | Toffler et al. | |
| 5,634,885 A * | 6/1997 | Kiro | 600/240 |
| 5,666,693 A * | 9/1997 | Levay | 16/114 R |
| 5,913,453 A * | 6/1999 | Coleman et al. | 221/24 |
| 5,993,870 A | 11/1999 | Hoeting et al. | |
| D420,903 S | 2/2000 | Liberty | |
| D423,183 S * | 4/2000 | Diresta | D1/105 |
| 6,054,158 A * | 4/2000 | Hart et al. | 426/134 |
| 6,159,492 A | 12/2000 | Manzone et al. | |
| 6,383,536 B1 * | 5/2002 | Palmer et al. | 426/104 |
| 6,485,348 B1 * | 11/2002 | Diresta | 446/73 |

* cited by examiner

CONFECTIONERY WITH BODY, HANDLE AND CONTAINER

CROSS-REFERENCE TO RELATED APPLICATIONS

This application is related to U.S. Utility Patent Applications entitled "Soda Bottle Confectionery," Ser. No. 09/874,440; and "Soda Bottle Confectionery With Open Top," Ser. No. 09/874,447; and "Self-Sealing Cap," Ser. No. 09/874,448; and to U.S. Design Patent Applications entitled "Alien Head for Confectionery Product," Ser. No. 29/142,929; "Alien Head for Confectionery Product," Ser. No. 29/142,928; "Alien Head for Confectionery Product," Ser. No. 29/142,930; "Alien Head for Confectionery Product," Ser. No. 29/142,932; and "Alien Body for Confectionery Product," Ser. No. 29/142,921, all of which are filed concurrently on even date herewith, and the specifications and drawings thereof are incorporated herein by reference.

COPYRIGHTED MATERIAL

A portion of the disclosure of this patent document and of the related applications listed above contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to a confectionery product comprising a handle portion, a body portion and a container, with preferably a flowable confectionery disposed therein.

2. Background Art

The confectionery industry uses a variety of tools or utensils to facilitate extraction of a candy material from a reservoir. For instance, the following design patents disclose candy dipping tools: U.S. Pat. No. Des. 264,298, entitled "Candy Dipping Tool," to Guttman, issued May 11, 1982, discloses a candy dipping tool with an elongated handle and a loop end; U.S. Pat. No. Des. 264,169, entitled "Candy Dipping Tool," to Guttman, issued May 4, 1982, discloses a candy dipping tool having an elongated handle and a forked end comprising two prongs; and U.S. Pat. No. Des. 264,038, entitled "Candy Dipping Tool," to Guttman, issued Apr. 27, 1982, discloses a candy dipping tool having an elongated handle and a spiral end for candy dipping. Another patent, U.S. Pat. No. 2,281,267, entitled "Eating Utensil," to Chapman, issued Apr. 28, 1942, discloses eating utensils wherein the food-holding portion of the eating utensil contains a layer of edible flavored material.

The dipping of a foodstuff directly into another foodstuff is relatively common practice in food manufacturing, food service, and amongst consumers in general. The following patents disclose matter germane to these practices:

U.S. Pat. No. 5,676,990, entitled "Method of Food Article Dipping and Whipping in a Condiment Container," to Wawrzynski, issued Oct. 14, 1997, discloses a method for removing excess condiment from a food article. The method has three steps: manipulating, inserting and removing. In the first step, manipulating, a slit is formed in a container containing the condiment. In the next step, inserting, the food article is inserted through the slit into the condiment container. The final step entails removing the food article from the container. As the food article is removed from the container, excess condiment is stripped off the food article as it passes through the slit.

U.S. Pat. No. 3,312,555, entitled "Handle-Anchored Formed Sugar Block and Method of Producing Same," to Rossi et al., issued Apr. 4, 1967, discloses a handle-anchored formed sugar block for stirring a beverage in a container. The purpose of the apparatus is to sugar-sweeten beverages.

U.S. Pat. No. 1,718,997 entitled "Frozen Confection," to Burt, issued Jul. 2, 1929, discloses a frozen confection substantially in the shape of a rectangular block attached to a stick handle. The confection may contain an edible shell composed of any suitable material such as chocolate, which will provide a relatively hard outer surface at normal temperatures. When chocolate is used, the frozen body portion is preferably dipped in the heated chocolate in substantially the same way that other candies and confections are dipped.

U.S. Pat. No. 5,370,884, entitled "Combination Sucker and Edible Powder," to Coleman, issued Dec. 6, 1994, discloses a confectionery apparatus having a top plastic cap for housing a hard candy sucker and a lower plastic container for housing a powder or granular candy. After removing the top cap, the hard candy is moistened and then dipped into the powder or granular candy. A similar product is marketed by The Topps Company, Inc. under the name "Baby Bottle Pop™".

U.S. Pat. No. 3,840,678, entitled "Edible Spooning Device," to Price, issued Oct. 8, 1974, discloses an edible product having food receiving cavities for spooning and consuming foodstuff.

Confectioneries having a shape of a non-edible are disclosed in the following patents: U.S. Pat. No. Des. 269,559, entitled "Confection on a Stick," to Sellares, issued Jul. 5, 1983, discloses a confection on a stick shaped in the form a fist with an extended index finger; U.S. Pat. No. Des. 260,045, entitled "Frozen Confection or Similar Article," to Frankel et al., issued Aug. 4, 1981, discloses a frozen confection or similar article that is in the shape of a foot; U.S. Pat. No. Des. 177,206, entitled "Confection," to Babcock, issued Mar. 27, 1956, discloses a tube piece confection shaped substantially like a spoon wherein the spoon end portion comprises a confection; U.S. Pat. No. Des. 92,473, entitled "Lollipop or Similar Article," to Keller, issued Jun. 12, 1934, discloses a lollipop or similar article in the shape of a mug with over-flowing froth; U.S. Pat. No. Des. 62,611, entitled "Hard Candy Confection," to Hochstraser, issued Jul. 3, 1923, discloses a hard candy confection having the shape of a face; and U.S. Pat. No. 16,030, entitled "Candy or Confection," to Schwarzschild and Greenfield, issued Apr. 7, 1885, discloses a candy or confectionery in the shape of a broom wherein both the whisk and handle portion comprise the confectionery.

Food products, comprising multiple foodstuffs, having at least one discrete compartment that allows for or facilitates mixing are disclosed in the following patents:

U.S. Pat. No. 3,413,128, entitled "Bottle," to Steinbarth et al., issued Nov. 26, 1968, discloses a bottle having two container portions. One container is designed to hold a liquid, such as an alcoholic beverage, while the other container is designed to hold a granular solid, such as salt.

U.S. Pat. No. 1,889,882, entitled "Container for Food Products," to Woods, issued Dec. 6, 1932, discloses a container for food products that has at least two sections. The sections hold different food products and can be opened to allow co-mingling of the different food products.

U.S. Pat. No. 1,983,685, entitled "Receptacle for Food Products," to Townsley, issued Dec. 11, 1934, discloses a receptacle for holding food products having a main bag portion and an auxiliary compartment. The auxiliary compartment is designed to contain a dry flavoring material. The auxiliary compartment may be opened such that the material contained within the compartment mixes with the material in the main bag portion.

U.S. Pat. No. 2,647,681, entitled "Seasoning Dispenser," to Paoli, issued Aug. 4, 1953, discloses a package for bulk food such as potatoes or popcorn having a separate compartment for seasoning.

U.S. Pat. No. 2,824,010, entitled "Flavor-Containing Milk Container Top," to Pedersen, issued Feb. 18, 1958,discloses a flavor-containing milk container top that affixes to a glass milk bottle, plastic milk bottle, or a carton milk container. The flavoring ingredients are released from the receptacle in the milk container top such that they mix with the milk.

Non-food products, having multiple components, having at least one discrete compartment that allows for or facilitates mixing are disclosed in the following patents:

U.S. Pat. No. 2,832,981, entitled "Device for Applying Liquid Adhesive or the Like," to Breuhan, issued May 6, 1958, discloses a flexible-bodied container for liquid adhesive paint. The device also has a brush that can be in either an inverted or extended position. In the extended position, liquid from the container flows through the bristles of the brush for application. In the inverted position, the brush is in contact with the liquid in the container or the gaseous environment created by the liquid in the container such that the bristles do not harden.

U.S. Pat. No. 3,386,792, entitled "Paint Kit," to Ireland, issued Jun. 4, 1968, discloses a device with a paintbrush and an integral container for paint. The paint container is housed in the end one end of the device while the paintbrush is positioned at the other end.

None of these references disclose a confectionery set comprising a complimentary handle and body portion wherein the body portion fits within the container and a flowable confectionery is disposed within the container and is extractable by the body portion.

SUMMARY OF THE INVENTION
(DISCLOSURE OF THE INVENTION)

The present invention comprises a confectionery set comprising: a handle portion, a body portion, a container, and a flowable confectionery wherein the flowable confectionery is containable within the container and extractable by the body portion. In a preferred embodiment of the present invention, the body portion is coatable and is made of edible or non-edible material. Non-edible material comprises materials such as, but not limited to, plastic, wood and metal. Edible material comprises, for example, but not limited to, materials such as artificial sweetener, sugar, corn syrup, water, flavor agent, color agent and the like. In a preferred embodiment, edible confectionery of the body portion comprises from between approximately 50%and 75% by weight of sugar; from between approximately 20% and 40% by weight of corn syrup; from between approximately 2% and 5% by weight of water; from between approximately 0.1% and 2% by weight of flavor agent; and from between approximately 0% and 1% by weight of color agent.

Flowable confectionery of the present invention comprises sugar-based or artificial sweetener-based confectionery. Combinations of sugar and artificial sweetener confectioneries are also within the scope of the present invention. Sugar-based flowable confectioneries of the present invention comprise materials such as, but not limited to, the following: sugar, organic acid, flavor agent, color agent, and flow agent. In a preferred embodiment of the present invention, flowable confectionery comprises from between approximately 90% and 98% by weight of sugar; from between approximately 1% and 6% by weight of organic acid; from between approximately 1% and 5% by weight of flavor agent; from between approximately 0.1% and 2% by weight of color agent; and from between approximately 0.1% and 5% by weight of flow agent. Flow agent comprises, for example, but not limited to, powdered cellulose, magnesium stearate, stearic acid, paraffin and microcrystalline waxes, polyethylene waxes, mineral and other lubricating oils, talc, silicone dioxide, lactose, calcium citrate and combinations thereof.

In a preferred embodiment of the present invention, the flowable confectionery comprises either or all of the following: a luminiferous confectionery, and a gas generating and/or gas releasing confectionery.

In the preferred embodiment, the flowable confectionery comprises a powder, although it may comprise a fluid. The fluid may comprise viscoelastic rheological properties.

The present invention is also of a confectionery comprising: a container having an open upper end portion; a handle portion matingly releasably engaging the upper end portion; and a hard, edible body carried by the handle and disposed within the container. In the preferred embodiment, the handle portion comprises a head portion, more preferably a humanoid head, and most preferably an alien head. The body portion preferably comprises at least one of a torso, a leg and an arm. The handle portion comprises a collar, wherein the collar engages with the container for attachment of the handle portion to the container. The collar attaches to the container by twisting. At least one of the collar and the container comprise a correlating set of tab and slot. A ridge that engages with the tab upon twisting. The container further comprises a flowable confectionery disposed therein. The body portion is coatable by the flowable confectionery and extractable by the coatable body portion. The flowable confectionery is at least one member of sugar-based and artificial sweetener-based confectionery, such as sugar, organic acid, flavor agent, color agent, and/or flow agent. The flow agent comprises at least one of powdered cellulose, magnesium stearate, stearic acid, paraffin and microcrystalline waxes, polyethylene waxes, mineral and other lubricating oils, talc, silicone dioxide, lactose, and calcium citrate. In alternative embodiments, the flowable confectionery comprises a luminiferous confectionery, gas-generating or gas-releasing confectionery, or a fluid (preferably with viscoelastic rheological properties). In an alternative embodiment, the handle portion further comprises an opening and a flowable confectionery disposed therein, and the set further comprises a removable cap for the opening. Preferably, the handle comprises a non-edible material which is rigid or semi-rigid, such as plastic, wood, rubber or metal. The edible body portion comprises at least one of sugar, corn syrup, water, flavor agent and color agent. An intermediate holder is employed for attachment of the handle portion to the body portion. The container preferably comprises a cylindrical shape.

The present invention is additionally of a humanoid-shaped confectionery comprising: a container having an open end, the container for receiving a flowable confectionery; a humanoid head including a collar, the head releasably attachable to the container open end through a collar; and an edible humanoid body attached to the head and disposed within the container. In the preferred embodiment, a flowable confectionery is disposed within the container. In an alternative embodiment, a flowable confectionery is disposed within the head portion. The collar and the container twist relative to each other for twist attachment. At least one of the collar and the container comprise a set of tab and slot for twist attachment.

The present invention is further of a confectionery in part shaped with human-like features comprising: a container including a reservoir open at one end; a plastic human-like head including a collar, the head attachable to the container reservoir open end through the collar; an edible human-like body attached to the head and within the container reservoir when the head is attached to the container; and a flowable confectionery disposed within the container reservoir; whereby the body may be wetted and dipped into the flowable confectionery so as to extract flowable confectionery. In the preferred embodiment, the body portion is non-edible, the collar and the container twist relative to each other for twist attachment, at least one of the collar and the container comprise a set of tab and slot for twist attachment. In an alternative embodiment, a flowable confectionery is disposed within the head portion.

The present invention is also of a confectionery set comprising: a container; a handle portion disposed directly above the container; and an edible body portion attached to the handle portion and disposed directly below the handle portion and within the container. In the preferred embodiment, the handle portion comprises a head portion, more preferably a humanoid head, and most preferably an alien head. The body portion preferably comprises at least one of a torso, a leg and an arm. The handle portion comprises a collar, wherein the collar engages with the container for attachment of the handle portion to the container. The collar attaches to the container by twisting. At least one of the collar and the container comprise a correlating set of tab and slot. A ridge that engages with the tab upon twisting. The container further comprises a flowable confectionery disposed therein. The body portion is coatable by the flowable confectionery and extractable by the coatable body portion. The flowable confectionery is at least one member of sugar-based and artificial sweetener-based confectionery, such as sugar, organic acid, flavor agent, color agent, and/or flow agent. The flow agent comprises at least one of powdered cellulose, magnesium stearate, stearic acid, paraffin and microcrystalline waxes, polyethylene waxes, mineral and other lubricating oils, talc, silicone dioxide, lactose, and calcium citrate. In alternative embodiments, the flowable confectionery comprises a luminiferous confectionery, gas-generating or gas-releasing confectionery, or a fluid (preferably with viscoelastic rheological properties). In an alternative embodiment, the handle portion further comprises an opening and a flowable confectionery disposed therein, and the set further comprises a removable cap for the opening. Preferably, the handle comprises a non-edible material which is rigid or semi-rigid, such as plastic, wood, rubber or metal. The edible body portion comprises at least one of sugar, corn syrup, water, flavor agent and color agent. An intermediate holder is employed for attachment of the handle portion to the body portion. The container preferably comprises a cylindrical shape.

The invention is additionally of a confectionery set comprising: a container; a head portion comprising a collar, the head portion disposed directly above the container, and the collar attachable to the container; and an edible body portion attached to the head portion and disposed directly below the handle portion and within the container. In the preferred embodiment, a flowable confectionery is disposed within the container. In an alternative embodiment, a flowable confectionery is disposed within the head portion. The collar and the container twist relative to each other for twist attachment. At least one of the collar and the container comprise a set of tab and slot for twist attachment.

The invention is further of a confectionery set comprising: a container; a head portion comprising a collar, the head portion disposed directly above the container, and the collar attachable to the container; a body portion attached to the head portion and disposed directly below the handle portion and within the container; and a flowable confectionery disposed within the container. In the preferred embodiment, the body portion is non-edible, the collar and the container twist relative to each other for twist attachment, at least one of the collar and the container comprise a set of tab and slot for twist attachment. In an alternative embodiment, a flowable confectionery is disposed within the head portion.

A primary object of the present invention is to provide a confectionery product having an edible portion, a non-edible portion and a storage container.

A primary advantage of the present invention is enhanced play value due to interactive features of the product.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
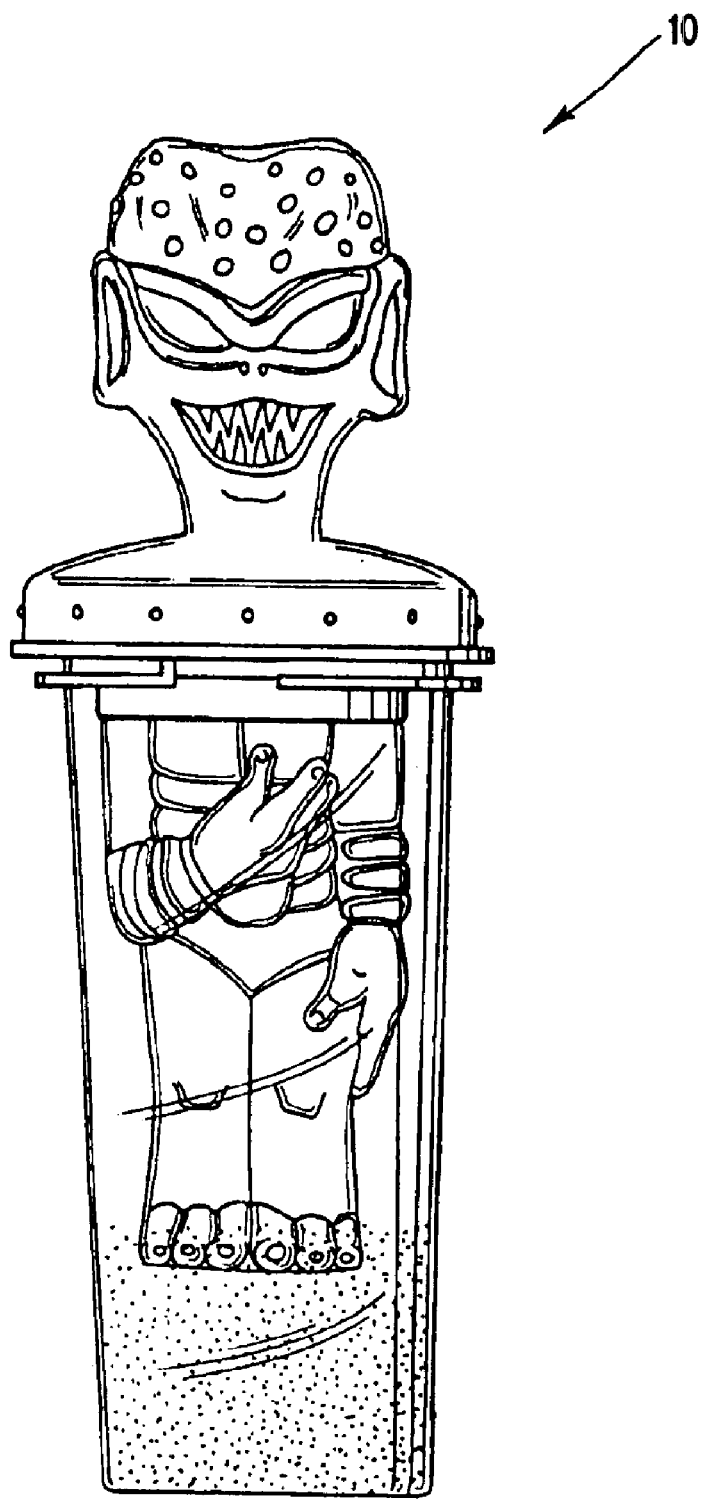
FIG. 1 is a perspective view of the preferred embodiment of the invention; showing handle portion comprising an alien head, body portion, container, and a flowable confectionery disposed therein, in a closed position.

DESCRIPTION OF THE PREFERRED EMBODIMENTS (BEST MODES FOR CARRYING OUT THE INVENTION)

The present invention comprises a confectionery product having a handle portion, a body portion, and a container. The preferred embodiment of the invention is shown in FIGS. 1–4, which illustrate a handle portion (generally referred to herein as "head portion") 10, a body portion 12, a container 14 in which the body portion 12 is disposed, a closure 16 between head portion 10 and container 14, and a confectionery 18 within container 14.

Figure 5:
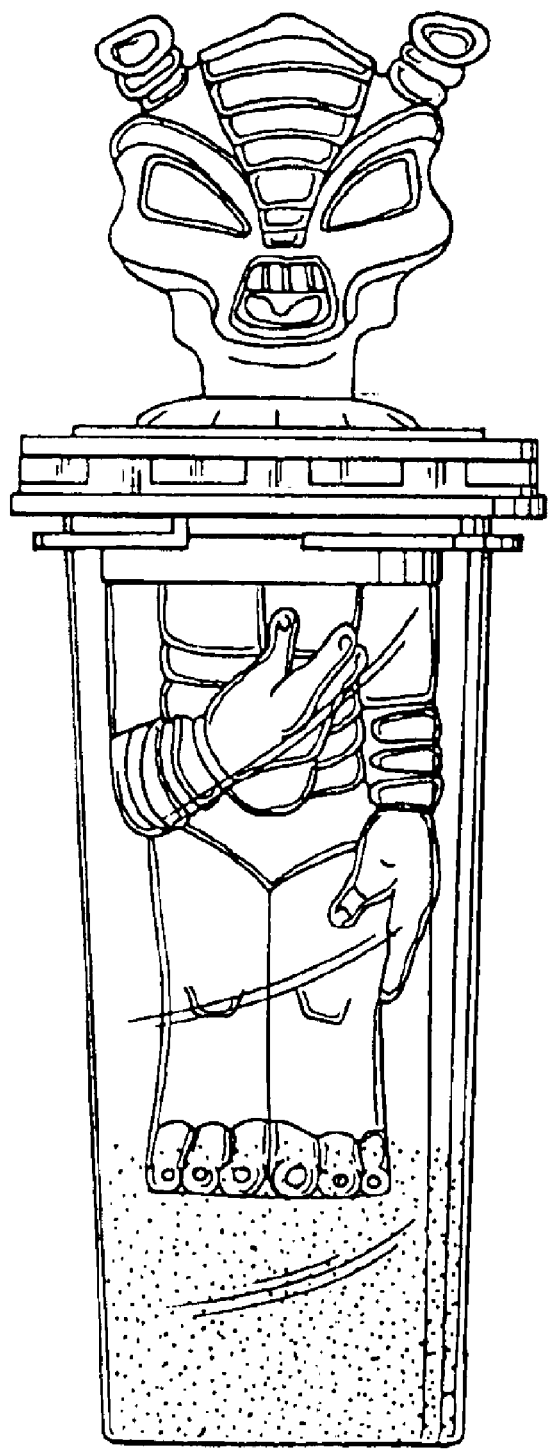
FIG. 5 shows an alternative alien head of the present invention.
Figure 6:
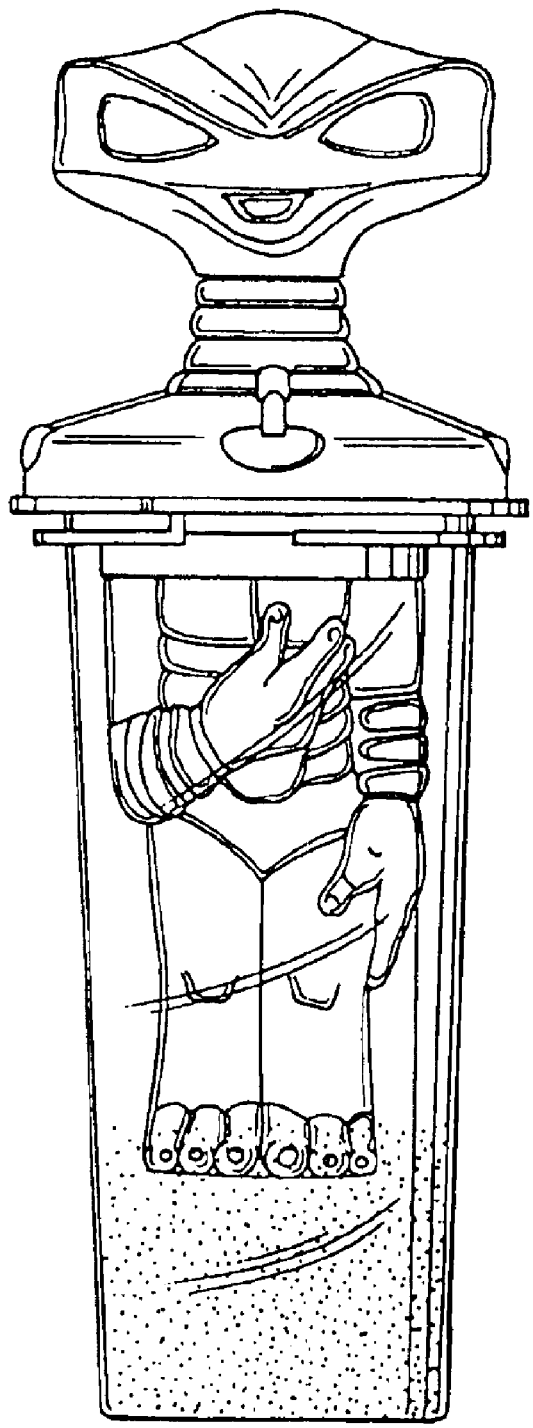
FIG. 6 shows an alternative alien head of the present invention.
Figure 7:
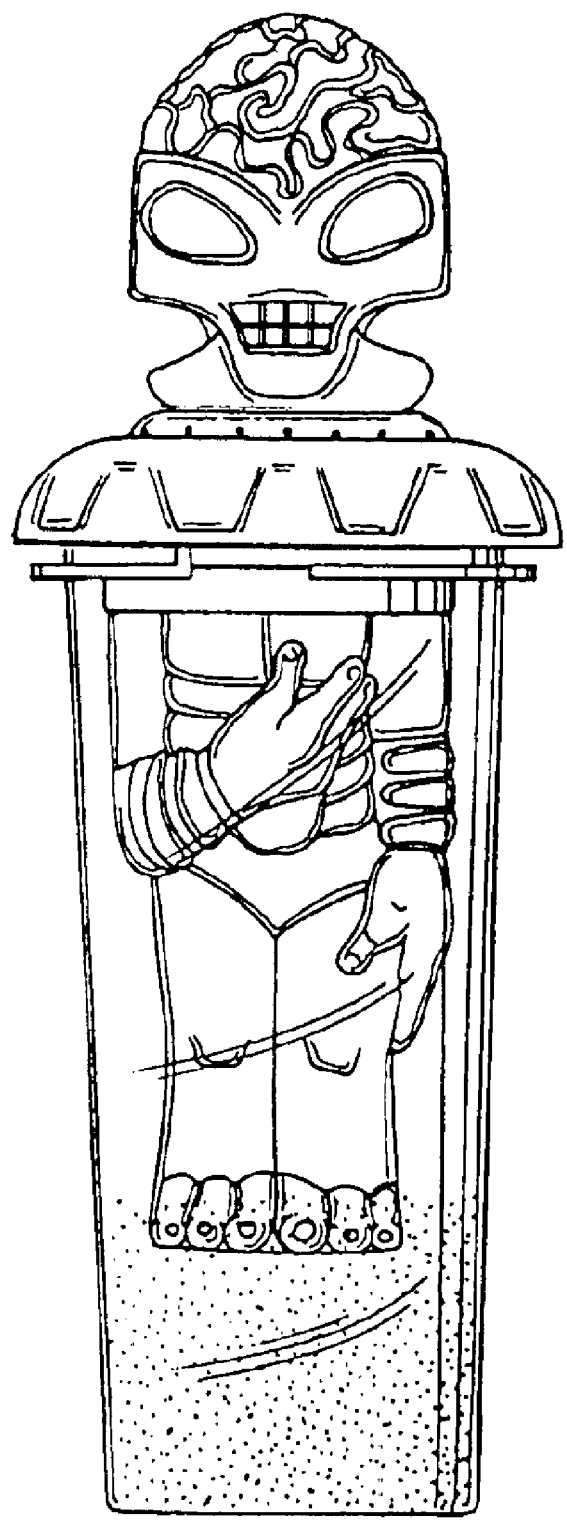
FIG. 7 shows an alternative alien head of the present invention.

In the preferred embodiment, head portion 10 comprises an alien head 20, neck 22 and collar 24. However, the invention is not limited to alien heads, but rather can be any type of handle or head, such as a head of a human, humanoid, mammal, insect, creature, and the like. The term "head portion," as used throughout the specification and claims, includes all such embodiments. The term "humanoid head," as used throughout the specification and claims is intended to include a human head, alien head, or other humanoid creature heads. FIGS. 5–7 show alternative alien heads.

Head portion 10 is preferably a non-edible and serves as a handle for the confectionery product. Head portion 10 is preferably made of plastic material (e.g. injection or vacuum molded plastic), but can also be made of other materials, such as metal, wood, rubber and the like. Handle 10 should be of a material that is easily held by a user, particularly when it is attached to container 14. In that regard, handle portion 10 is preferably made of a rigid or semi-rigid material.

Figure 2:
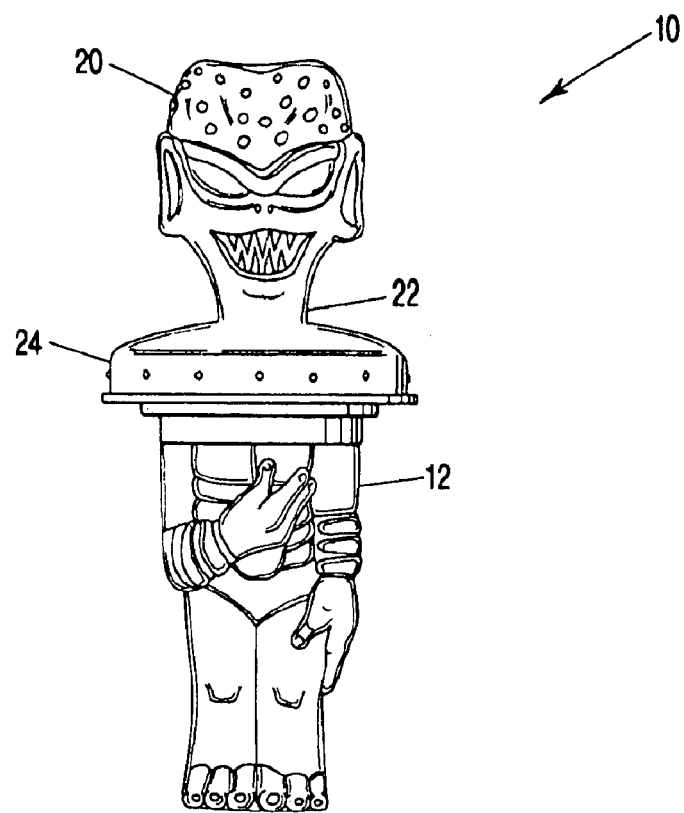
FIG. 2 is a perspective view of the embodiment of FIG. 1 in an open position.
Figure 2:
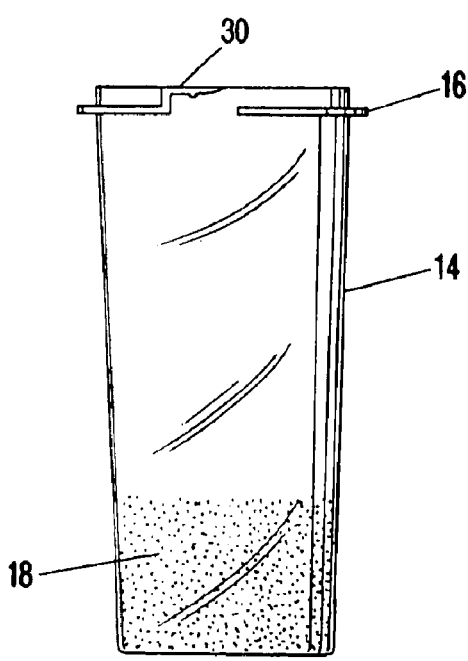
Figure 3:
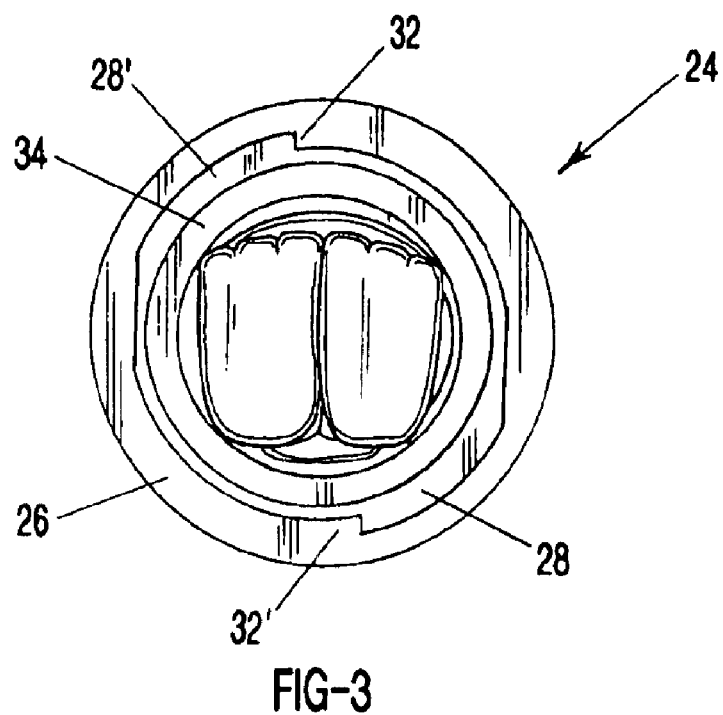
FIG. 3 is a bottom view of a collar attachment of FIG. 1.
Figure 4:
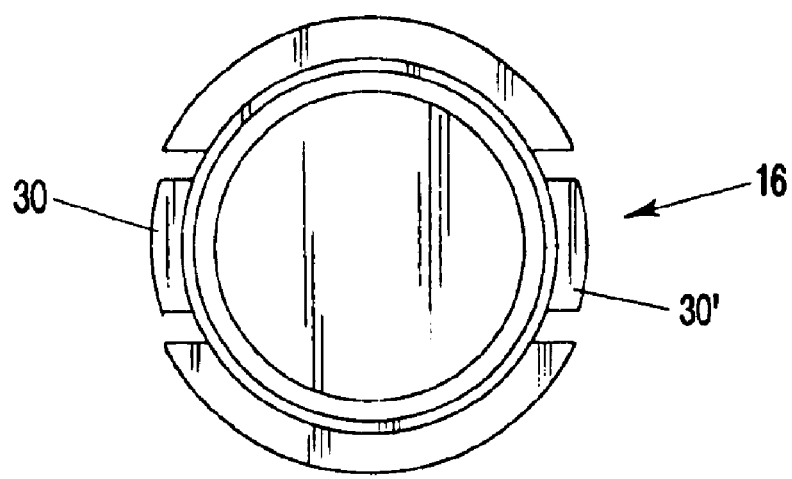
FIG. 4 is a top view of the container attachment section of FIG. 1.

As best shown in FIGS. 2–4, collar 24 of head portion 10 attaches to container 14 so that head portion is disposed directly on top of container 14 and preferably seals container 14. The drawings show a twist-type 26 of attachment or closure 16 in which tab 30 on container 14 fits into slot 28 in collar 24. Collar 24 is then twisted or turned relative to container 14 so that tab 30 slides under a ridge 32 on collar 24. Collar preferably comprises at least two slots 28, 28' and two ridges 32, 32' and container 14 preferably comprises at least two tabs 30, 30' so that the user can easily fit either tab 30, 30' into either slot 28, 28' and turn or slide tab 30 or 30' under either ridge 32, 32'.

Although a twist-type attachment 26 is illustrated as the preferred closure 16 in FIGS. 2–4, the invention is not limited to this type of attachment. For example, head portion 10 may be disposed on container 14 by the following: screw-on attachment, molded lip-rim, snap on, clamp, form or friction fit, and the like. The invention is not limited to the particular twist attachment 26 shown in the drawings.

In the preferred embodiment, as show in the drawings, body portion 12 is attached to and directly below head portion 10 and is disposed within container 14. Body portion 12 cannot interfere with attachment 26 of head portion 10 to container 14 and is therefore of a smaller diameter or width than container 14 and head portion 10. FIG. 1 further shows intermediate holder 34 that assists in attaching body portion 12 to head portion 10. This is particularly useful when body portion 12 is an edible material and head portion 10 is a non-edible material.

The term "body" as used throughout the specification and claims is intended to include a lower portion complimentary to handle/head portion 10. The examples shown in the drawings are of alien arms/torso/legs 12 that correlate to the alien heads 10. However, the invention is not limited to alien heads and bodies, but can be heads and bodies of other creatures, or handle/body arrangements of other items.

Body portion 12 is preferably an edible material, but can be a non-edible material. Body portion 12 is preferably coatable so that it can be licked by a user and then dipped into flowable confectionery 18 disposed in container 14, which then sticks to body portion 12. Body portion 12 is dipped into flowable confectionery 18 disposed within container 14, either before or after the user licks body portion 12. In the preferred embodiment, body portion 12 is preferably an edible and coatable candy. The candy can be molded into the desired shape.

Flowable confectionery 18 of the present invention comprises a flowable substance such as a liquid or a powder, or combination thereof. The confectionery is preferably a powder, and optionally may comprise a gas-generating, gas-releasing or "popping" type of powder. Confectionery 18 may also be a fluid or liquid, e.g. a viscous liquid.

Regarding the composition of confectioneries of the present invention, a hard candy portion (e.g., body portion 12) is preferably manufactured from, for example:

Sugar (from between approximately 55% and approximately 75% by weight);

Corn syrup (from between approximately 20% and approximately 40% by weight);

Water (from between approximately 1% and approximately 5% by weight);

Flavor agent (from between approximately 0.1% to approximately 2% by weight); and Color agent (from approximately less than 1% by weight).

A candy powder portion (e.g., flowable confectionery 18), is preferably manufactured from, for example:

Sugar (from approximately 90 to approximately 98% by weight);

Malic Acid (from approximately 1% to approximately 6% by weight);

Flavor Agent (from approximately 1% to approximately 5% by weight);

Color Agent (from approximately 0.1% to approximately 2% by weight); and

Flow Agent (from approximately 0.1% to approximately 5% by weight).

The flow agent comprises a substance that promotes flowability of the candy powder. Flow agents may comprise, but are not limited to, for example, powdered cellulose, magnesium stearate, stearic acid, paraffin and microcrystalline waxes, polyethylene waxes, mineral and other lubricating oils, talc, silicone dioxide, lactose, calcium citrate and the like. In general, flow agents reduce attractive and/or frictional forces between particles and/or absorb moisture. Flow agents are sometimes known as anti-caking agents and/or desiccating agents. Examples of useful flow agents include CAB-O-SIL® (Cabot Corporation, Boston, Mass.) and SYLOID® (W.R. Grace & Co., New York, N.Y.).

Alternatives are given below where a hard candy portion is manufactured from ingredients in the following possible ranges:

Sugar (from approximately 0% to approximately 95% by weight);

Corn syrup (from approximately 0% to approximately 80% by weight);

Water (from approximately 0% to approximately 50% by weight);

Flavor Agent (from approximately 0% to approximately 20% by weight); and

Color Agent (from approximately 0% to approximately 10% by weight).

Likewise, a candy powder portion may be manufactured from ingredients in the following possible ranges:

Sugar (from approximately 0 to approximately 100% by weight);

Malic Acid (from approximately 0% to approximately 40% by weight);

Flavor Agent (from approximately 0% to approximately 20% by weight);

Color Agent (from approximately 0% to approximately 10% by weight); and

Flow Agent (from approximately 0% to approximately 5% by weight).

In an alternative embodiment, head portion 10, body portion 12, container 14 or confectionery 18 may be luminiferous in that they give off or transmit light. The term luminiferous encompasses, but is not limited to, luminescence, fluorescence, and phosphorescence. For example, a light source may be housed within head portion or body portion. In such an embodiment of the present invention, a light source comprises, for example, but is not limited to, a light bulb or a light emitting diode. Power for driving the source comprises, for example, but is not limited to battery power, mechanical-to-electrical energy power, and/or solar-to-electrical energy power.

In an alternative embodiment, handle portion 10 further comprises a cavity and a cap (not shown) wherein flowable confectionery (e.g., candy powder) is stored and removable when the cap is taken off. In one embodiment, the flowable confectionery is initially provided in container 14 and in the cavity of handle portion 10, where it is capped off. When the flowable confectionery in container 14 is all or partially used up, it can be refilled by uncapping handle portion 10, and pouring the flowable confectionery contained therein into container 14. Alternatively, the flowable confectionery is provided initially only in handle portion 10. When the user wants to eat the flowable confectionery, he/she uncaps handle portion 10 and pours the flowable confectionery into container 14.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and such variation and modifications are covered in this disclosure to the extent that they are modifications and/or equivalents. The entire disclosures of all references, applications, patents, and publications cited above are hereby incorporated by reference.

What is claimed is:

1. A confectionery set comprising:

a container comprising an opening and powder confectionery disposed therein;

a non-edible handle portion disposed directly above said container;

a lower portion disposed directly below said handle portion and removably positionable within said container; and said handle portion and said lower portion comprising, in combination, an entire body of an individual figurine;

said handle portion comprising an upper body portion of said entire body and said lower portion comprising a lower body portion of said entire body;

said entire body further comprising a cap for said opening of said container disposed on a middle portion of said figurine; and said figurine comprising an alien, human, humanoid, mammal, insect, or creature.

2. The confectionery of claim 1 wherein said container comprises a cylindrical shape.

3. The confectionery of claim 1 wherein said powder confectionery comprises at least one member selected from the group consisting of a sugar-based confectionery and an artificial sweetener-based confectionery.

4. The confectionery of claim 1 wherein said powder confectionery comprises at least one member selected from the group consisting of sugar, organic acid, flavor agent, color agent, and flow agent.

5. The confectionery of claim 4 wherein said flow agent comprises at least one member selected from the group consisting of powdered cellulose, magnesium stearate, stearic acid, paraffin and microcrystalline waxes, polyethylene waxes, mineral and other lubricating oils, talc, silicone dioxide, lactose, and calcium citrate.

6. The confectionery of claim 1 wherein said powder confectionery comprises a luminiferous confectionery.

7. The confectionery of claim 1 wherein said powder confectionery comprises at least one member selected from the group consisting of gas-generating and gas-releasing confectionery.

8. The confectionery of claim 1 wherein said cap comprises a collar.

9. The confectionery of claim 8 wherein said collar matingly releasably engages and attaches to said container.

10. The confectionery of claim 8 wherein said collar engages with said container for attachment of said handle portion to said container.

11. The confectionery of claim 10 wherein said collar and said container twist relative to each other for twist attachment.

12. The confectionery of claim 11 wherein at least one of said collar and said container comprise a set of tab and slot for twist attachment.

13. The confectionery of claim 12 further comprising a ridge that engages with said tab upon twisting.

14. The confectionery of claim 1 wherein said handle portion comprises a rigid or semi-rigid material.

15. The confectionery of claim 1 wherein said handle portion comprises at least one material selected from the group consisting of plastic, wood, rubber and metal.

16. The confectionery of claim 1 wherein said handle portion comprises a head portion.

17. The confectionery of claim 16 wherein said head portion comprises a head configuration of said alien, human, humanoid, mammal, insect, or creature.

18. The confectionery of claim 1 wherein said handle portion further comprises an opening and a powder confectionery disposed therein.

19. The confectionery of claim 1 wherein said lower portion is non-edible.

20. The confectionery of claim 1 wherein said lower portion is edible.

21. The confectionery of claim 1 wherein said lower portion is carried by said handle portion.

22. The confectionery of claim 1 wherein said lower portion is coatable by said powder confectionery and extractable by said coatable lower portion.

23. The confectionery of claim 1 wherein said edible lower portion comprises at least one member selected from the group consisting of sugar, corn syrup, water, flavor agent and color agent.

24. The confectionery of claim 1 wherein said container further comprises a flat bottom.

\* \* \* \* \*